United States Patent
Gao et al.

(10) Patent No.: US 12,356,115 B2
(45) Date of Patent: Jul. 8, 2025

(54) VOICE FEEDBACK DURING VIDEO CONFERENCES

(71) Applicant: Zoom Video Communications, Inc., San Jose, CA (US)

(72) Inventors: Qiang Gao, Charlotte, NC (US); Zhaofeng Jia, Saratoga, CA (US)

(73) Assignee: Zoom Communications, Inc., San Jose, CA (US)

( * ) Notice: Subject to any disclaimer, the term of this patent is extended or adjusted under 35 U.S.C. 154(b) by 234 days.

(21) Appl. No.: 18/116,981

(22) Filed: Mar. 3, 2023

(65) Prior Publication Data

US 2024/0297959 A1    Sep. 5, 2024

(51) Int. Cl.
| | |
|---|---|
| *H04N 7/15* | (2006.01) |
| *G10L 21/013* | (2013.01) |
| *G10L 21/0208* | (2013.01) |
| *H04N 7/14* | (2006.01) |

(52) U.S. Cl.
CPC ............ *H04N 7/152* (2013.01); *G10L 21/013* (2013.01); *G10L 21/0208* (2013.01); *H04N 7/147* (2013.01); *G10L 2021/0135* (2013.01); *G10L 2021/02082* (2013.01)

(58) Field of Classification Search
CPC ...... H04N 7/152; H04N 7/147; G10L 21/013; G10L 21/0208; G10L 2021/0135; G10L 2021/02082
See application file for complete search history.

(56) References Cited

U.S. PATENT DOCUMENTS

| | | | |
|---|---|---|---|
| 2007/0036297 A1* | 2/2007 | Miranda-Knapp | ... H04M 15/06 379/88.19 |
| 2023/0224636 A1* | 7/2023 | Veselinovic | ........... H04R 1/326 381/58 |
| 2023/0291839 A1* | 9/2023 | Madhey | ............... G06F 3/04842 |
| 2023/0308826 A1* | 9/2023 | Stewart | ..................... H04N 7/18 |

* cited by examiner

*Primary Examiner* — Stella L. Woo

(74) *Attorney, Agent, or Firm* — Kilpatrick Townsend & Stockton LLP

(57) ABSTRACT

Systems and methods for providing voice feedback for video conferences are provided. A computer-implemented method includes joining, by a client device, a video conference hosted by a video conference provider, the video conference having a plurality of participants using a plurality of client devices. With voice feedback enabled, the client device may receive a first audio stream from the video conference provider, the first audio stream associated with a first participant of the plurality of participants and a second audio stream from a user of the client device, the second audio stream comprising a voice of the user of the client device. The client device can play the first audio stream on one or more channels of one or more audio devices connected to the client device and play the second audio stream on the one or more channels of the one or more audio devices.

20 Claims, 7 Drawing Sheets

VOICE FEEDBACK DURING VIDEO CONFERENCES

FIELD

The present application generally relates to audio playback, and more particularly relates to systems and methods for voice feedback during video conferences.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
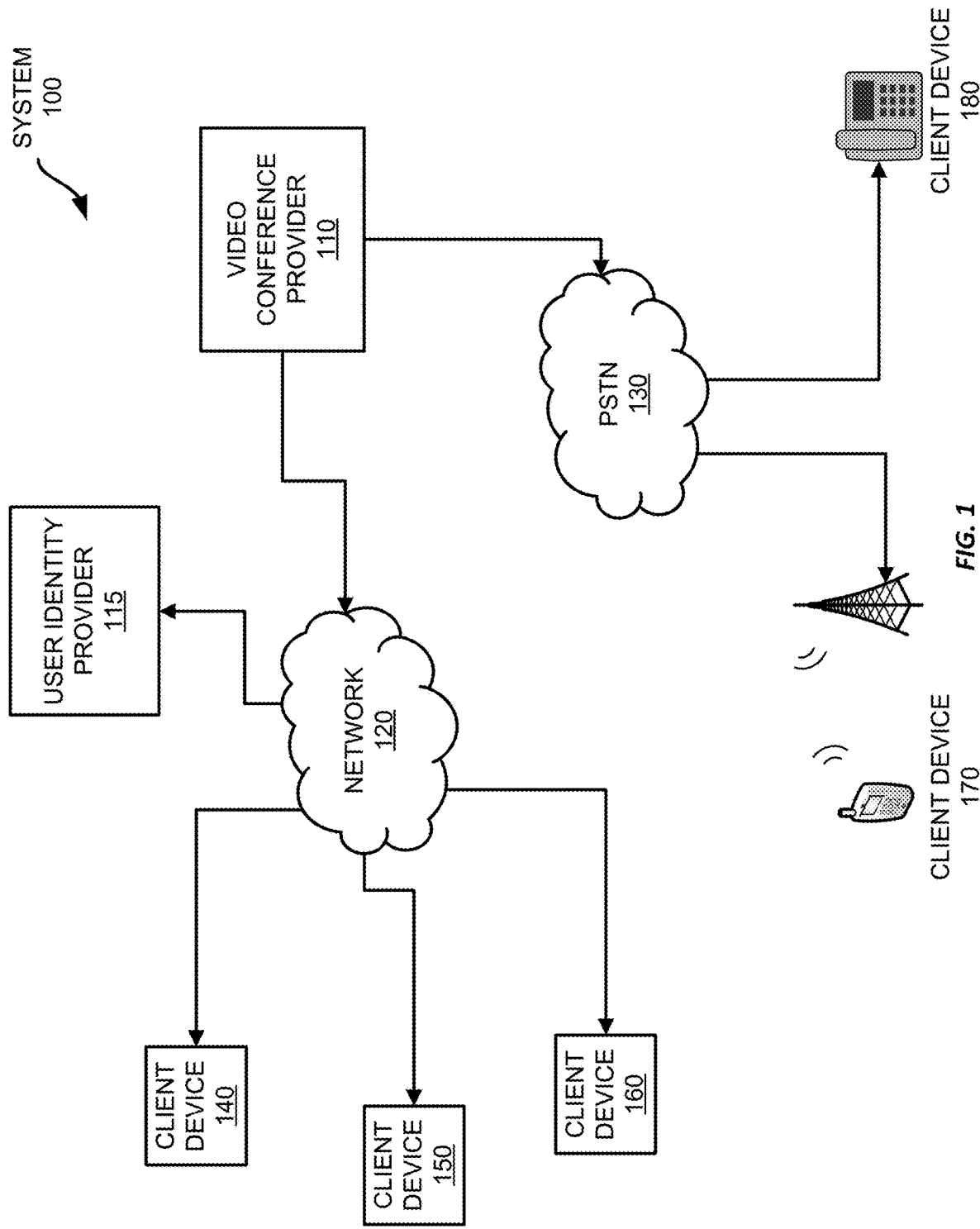
FIG. 1 shows an example system that provides videoconferencing functionality to various client devices.

Examples are described herein in the context of systems and methods for voice feedback. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing is a prevalent medium for remote personal and business communications. Video conferencing provides all of the advantages of video communication and screen sharing along with the benefits of traditional, audio-based telephonic communication. The combination of video and audio communications in diverse locations outside the workplace such as the home and public spaces has highlighted a common set of audio difficulties frequently encountered by video conference participants. For example, a video conference participant might mute their outgoing audio stream only to later forget that it is muted, but only after speaking while muted for several seconds or longer. In another example, a client device may provide the video conference participant with a de-noise setting to reduce the level of background noise in the participant's outgoing audio stream. But the participant may have no way of knowing the effectiveness of such a setting without receiving feedback from other participants.

These difficulties can be addressed using example systems and methods for voice feedback during video conferences. The following non-limiting example is provided to introduce certain embodiments. In this example, a user of a client device may join a video conference hosted by a video conference provider including one or more other participants. Client devices of each participant may provide both an incoming and an outgoing audio stream. For instance, the user may use a microphone connected to the client device to capture an outgoing audio stream that can be played back to the other participants. The client device may also play back incoming audio consisting of a multiplexed audio stream of all the other participants' audio streams.

The client device may have one or more audio playback devices. Common examples of such devices include speakers, headsets, headphones, earphones, and the like. Playback devices can have one or more channels. A channel is a collection of components and/or circuitry used to convey one or more audio streams. In this example, the incoming audio stream of the other participants may be played back on one or more channels of the audio playback devices in use with the client device. In contrast, prior to employment of the innovations of the present disclosure, the outgoing audio stream of the user may only be heard by the other participants, resulting in a poor user experience.

The client device may receive an indication to enable voice feedback. For instance, the user may toggle a configuration setting provided by the client device. Upon enablement of voice feedback, the user's audio stream may be captured by an audio input device (e.g., a microphone) and then played back on the audio playback device(s). The user's audio stream is also sent to the client devices of the other video conference participants for simultaneous playback. At the same time, the client device receives one or more incoming audio streams from the other participants. For example, for a client device with a single speaker with a single channel, both the incoming and the outgoing audio streams may be played back on the single channel of the single speaker. In other words, the user's own voice may be heard on the speaker, in substantially real-time (without noticeable delay or lag), along with the incoming audio streams from the other participants.

In some examples, the audio stream containing the user's outgoing audio stream may be played back on a separate audio channel. For instance, in a configuration in which a client device is used with two speakers, each speaker having one channel, the incoming audio stream of the other participants can be played back on the channel of the first speaker. With voice feedback employed, the outgoing audio stream of the user can be played back on the channel of the second speaker.

In some examples, a spatial audio algorithm can be used for playback of the user's outgoing audio stream. A spatial audio algorithm may include any technique for recreating three-dimensional ("3D") sounds on two or more channels of one or more playback devices. A spatial audio algorithm could be used to create a sense of distance or direction for the physical source of a given audio stream. For example, the user's outgoing audio stream could be processed by a spatial audio algorithm and played back on two channels of one or more playback devices. In one example, a user may attend the video conference using a headset with two audio channels, which also includes a microphone. The user's outgoing audio stream is processed by a spatial audio algorithm and played back to the user during the video conference over the two channels of the headset, causing the user to experience the audio stream with an apparent distance and direction. In other words, the user can have the experience of their own voice being played back from a synthetic sound source some distance and direction away from the physical location of the user. For instance, the user could be caused, by the spatial audio algorithm, to have the subjective experience of hearing their own voice coming from 30° relative to the forward direction from 20 feet away.

In some examples, various properties of the user's outgoing audio stream can be varied to distinguish its playback from the incoming audio stream of the other participants in the video conference. For example, the volume of the playback of the incoming stream can be varied relative to the volume of the playback of the outgoing audio stream. In this way, the two streams can be distinguished when they are played back simultaneously. Other properties that can be varied may include tone, playback speed, modulation, among other qualities of audio streams.

In some examples, the user's outgoing audio stream may be processed before being sent to the other participants of the video conference. The processing may also occur before the outgoing audio stream is played back on a channel of a playback device associated with the client device with voice feedback enabled. Some examples of processing that may be applied to the outgoing audio stream include a gain control algorithm, an echo control algorithm, and a de-noising algorithm. In some embodiments, a voice alteration algorithm can be applied to the outgoing audio stream before it is sent for playback.

In some examples, the client device may receive an indication to disable voice feedback. For instance, the user may toggle a configuration setting provided by the client device. With voice feedback disabled, playback of the user's outgoing audio stream on a playback device connected to the client device is stopped on all channels, while playback of the incoming audio stream of the other participants may continue.

In some embodiments, the playback of the user's outgoing audio stream can be varied among playback devices and channels. For instance, the client device can provide configuration settings that include options for playing back the user's audio stream on one or more particular channel(s) or on one or more particular playback device(s). A user may, for example, elect to shift the playback of their audio stream from a first channel to a second channel, or from speakers to a headset.

The innovations of the present disclosure provide a significant improvement in the user experience for video conference participants in the field of video conferencing technology. Some implementations of voice feedback may have no discernable lag or delay in playback of the user's outgoing audio stream, resulting in near real-time feedback. In the typical case of a video conference with several participants, the embarrassing and time-wasting experience of talking into a muted microphone can be prevented with voice feedback deployed. Likewise, the effects of de-noising processing and other signal processing can be heard by the user without the need to receive delayed feedback from other participants to determine the effects of such processing. Similarly, the impact that background noise might have on a video conference can be immediately determined by the user, again without the need to receive feedback from other participants. In some cases, a user might be the only participant in a video conference created for the purpose of making a recording for others to view. It may not be possible to monitor the audio while such a self-recording is made, resulting in the frustrating need to re-create the recording in the event of an error. The voice feedback can allow a user making a self-recording to monitor the quality, level, processing, etc. of their own audio stream during the creation of the recording. Relatedly, voice feedback during a video conference can be used to allow a user to regulate the volume of their own voice based on the intensity of the voice feedback.

These illustrative examples are given to introduce the reader to the general subject matter discussed herein and the disclosure is not limited to these examples. The following sections describe various additional non-limiting examples and examples of systems and methods for voice feedback during video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
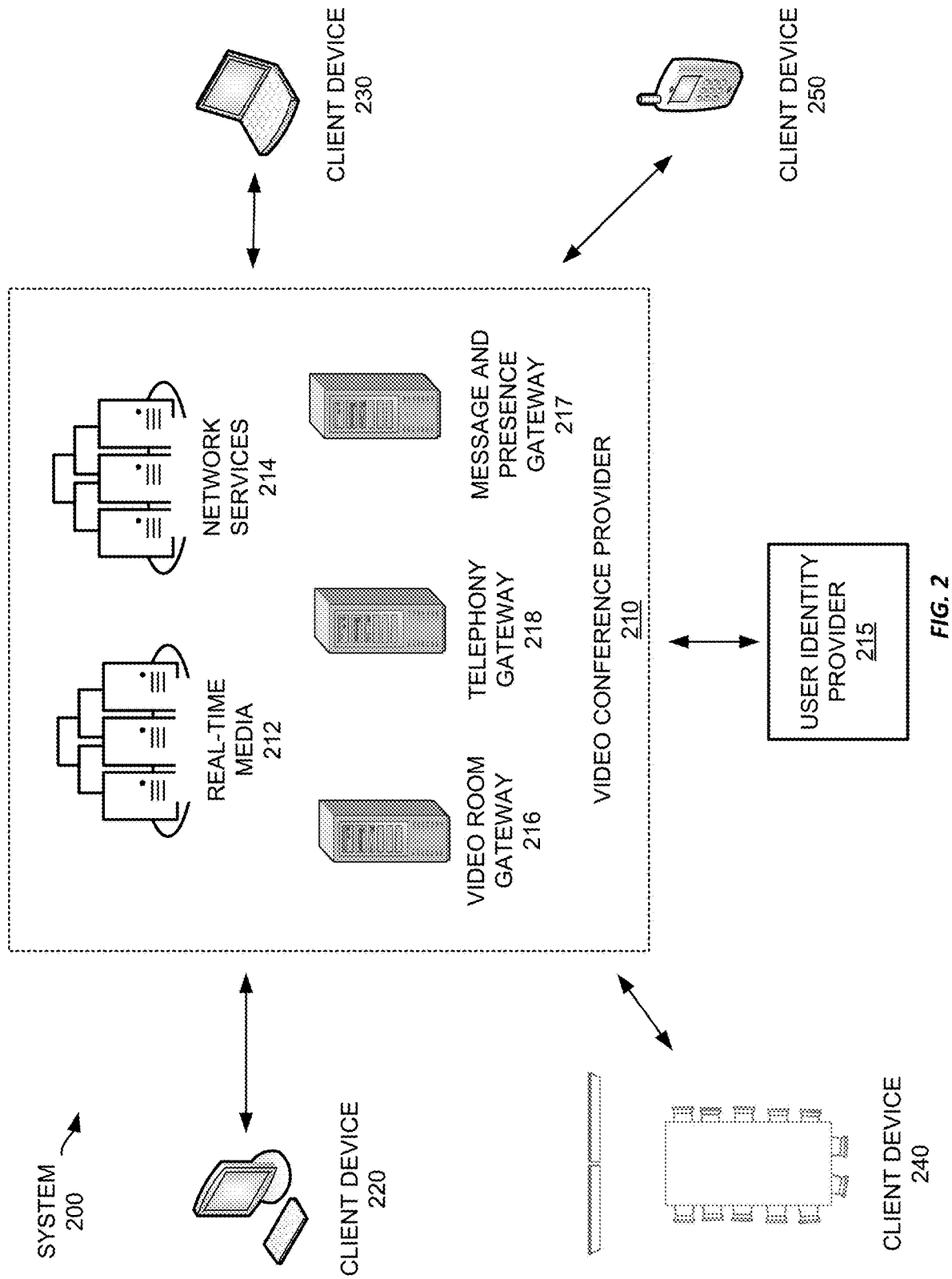
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
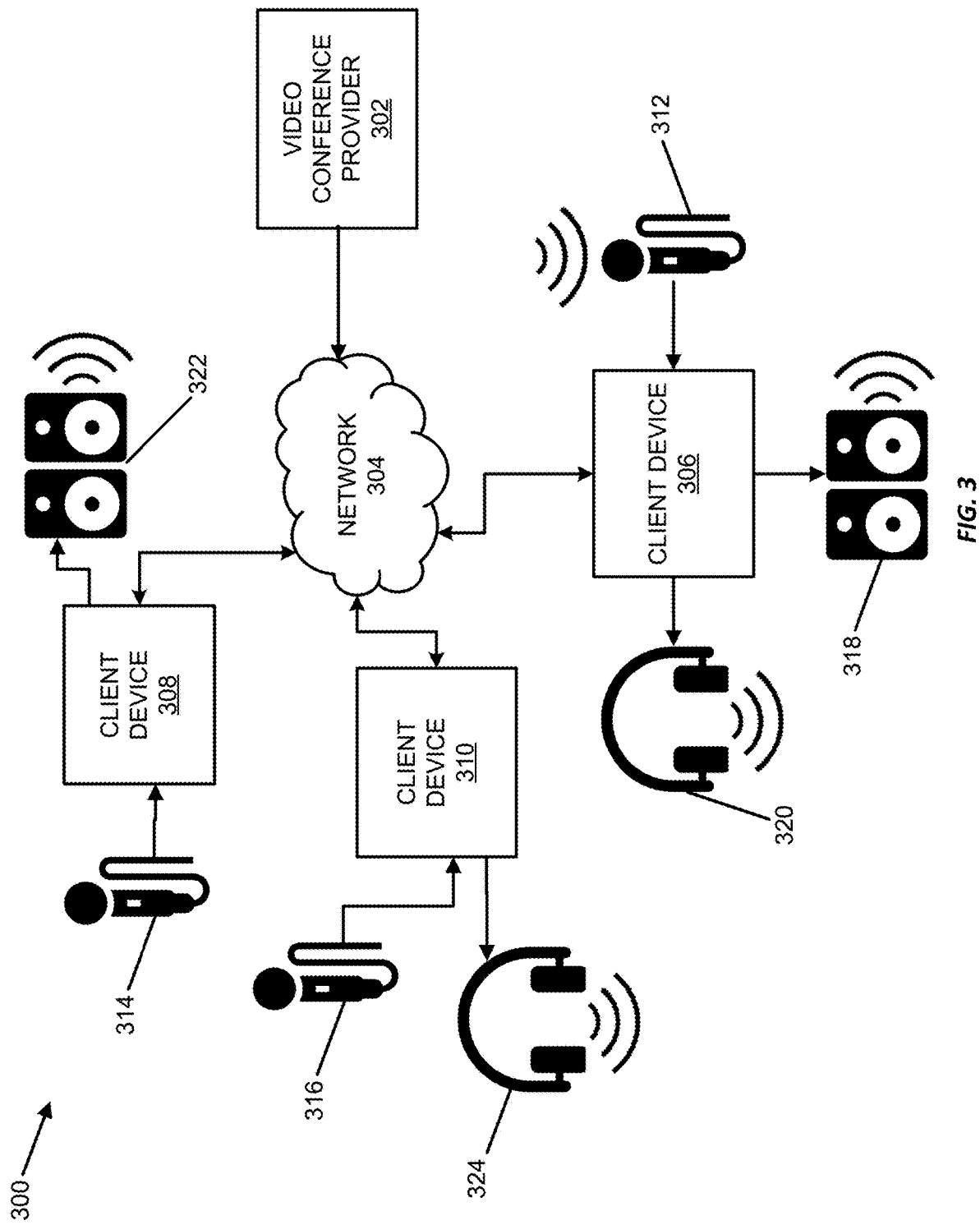
FIG. 3 shows an example of a system for voice feedback during video conferences, according to some aspects of the present disclosure.

Referring now to FIG. 3, FIG. 3 shows an example of a system 300 for voice feedback during video conferences, according to some aspects of the present disclosure. One or more client devices 306, 308, 310 are communicatively coupled with a video conference provider 302. For example, the client devices 306, 308, 310 may be coupled to the video conference provider over a network 304. The network 304 can include public networks, private networks, the Internet, or any other suitable combination of networked devices. In some embodiments, the client devices 306, 308, 310 may be configured using point-to-point networking and may be directly communicatively coupled with each other.

In example system 300, the video conference provider 302 hosts a video conference with one or more participating client devices. In some examples, a single client device can start a video meeting with no other participants in order to create a recording. In another example, a plurality of client devices may join together to participate in a video conference simultaneously. A video conference may include the video streams of each participant being sent from each respective client device to the video conference provider and then to the client devices of the remaining participants. For example, example system 300 depicts three client devices 306, 308, 310 that may be participants in a video conference.

In addition to a video stream, the video conference may include one or more audio streams. An audio stream may include the audio captured by an audio input device for one or more participants. The audio stream may be sent, by the client devices 306, 308, 310 to the video conference provider 302 over the network 304. The video conference provider 302 may then send the audio stream to the other participants for playback. Some example embodiments may utilize a point-to-point connection approach in which the audio stream may be sent directly from one client device to another over the network 304.

Turning now to a particular client device 306, the client device 306 may be a personal computer, laptop, smartphone, tablet, or similar device. The client device 306 receives audio input through a microphone 312. The microphone 312 may be an internal or external microphone. For example, the microphone 312 may be a built-in microphone included as part of the hardware making up the client device 306. In other examples, the microphone 312 may be an external microphone communicatively coupled to the client device 306. For instance, the microphone 312 may be a commercially available microphone that is connected to the client device with a physical connection (e.g., wire) or wirelessly connected using WiFi, Bluetooth, etc. The microphone 312 may be a monophonic ("mono") microphone that captures one audio channel or a stereo microphone that captures two audio channels. Some microphones may capture a plurality of audio channels.

The client device 306 plays back audio to one or more connected audio playback devices. In example system 300, the client device 306 is connected to speakers 318 and headphones 320. The audio devices can be used to play back audio received from other participants in a video conference. For example, for the video conference depicted in example system 300, audio input may be captured using microphones 314, 316 connected to client devices 308, 310. The audio input captured by microphones 314, 316 can be played back to the audio output devices connected to client device 306.

The speakers 318 may include one or more speakers. Speakers 318 may play back audio over one or more audio channels. A single speaker may itself include one or more speakers. For example, a single enclosure can house one or more speakers. Likewise, headphones 320 may include one or more speakers embedded in one or more earpieces. Like with the speakers 318, the embedded speakers may themselves include one or more speakers. Headphones 320 may play back audio over one or more audio channels. These examples of audio input and output hardware are non-limiting and a person having skill in the art will recognize that a large variety of audio hardware may be used for both capturing audio and playing back audio.

In some examples, audio input received from a user of the client device 306 using microphone 312 is sent to the other client devices 308, 310 for playback. For example, client device 308 is connected to speakers 322 and client device 310 is connected to headphones 324. However, client device 306 may be configured to enable voice feedback. In that case, the audio input from a user of the client device 306 using microphone 312 may also be played back on the audio output devices connected to client device 306. In other words, with voice feedback enabled, when a user of client device 306 speaks into microphone 312, the user's voice may be heard both by participant client devices 308, 310 and by the user of client device 306. Client device 308 may play back the user's voice over speakers 322. Client device 310 may play back the users voice over headphones 324. Client device 306 may play back the user's voice over speakers 318 and/or headphones 320. The playback of the audio stream of the user of client device 306 over the audio playback devices connected to client devices 306, 308, 310 can be simultaneous, in near real-time. The playback of the audio stream of user of client device 306 can be configured in a variety of ways that will be discussed in detail in FIG. 4.

Figure 4:
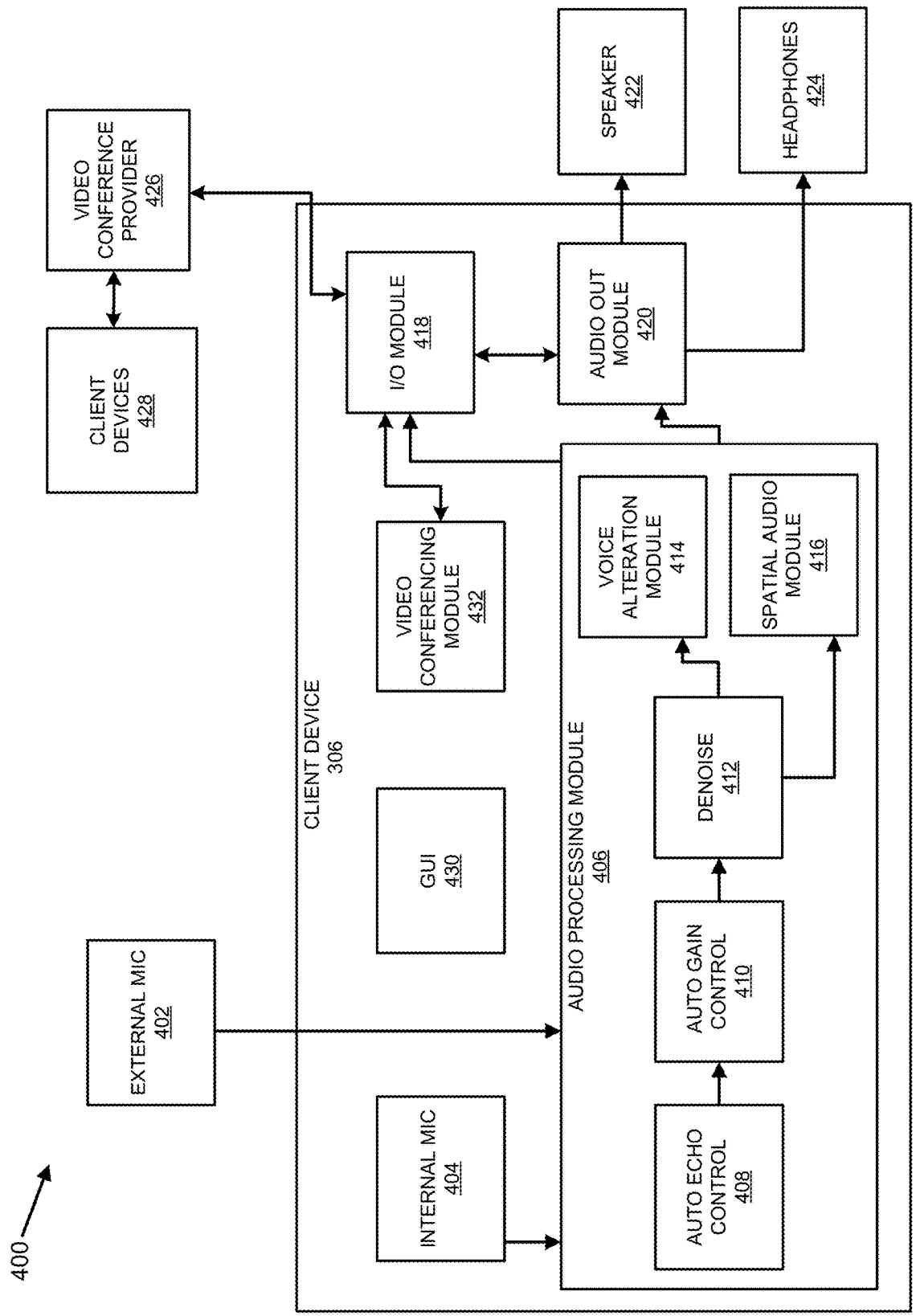
FIG. 4 shows an example of a system for voice feedback during video conferences, according to some aspects of the present disclosure.
Figure 5:
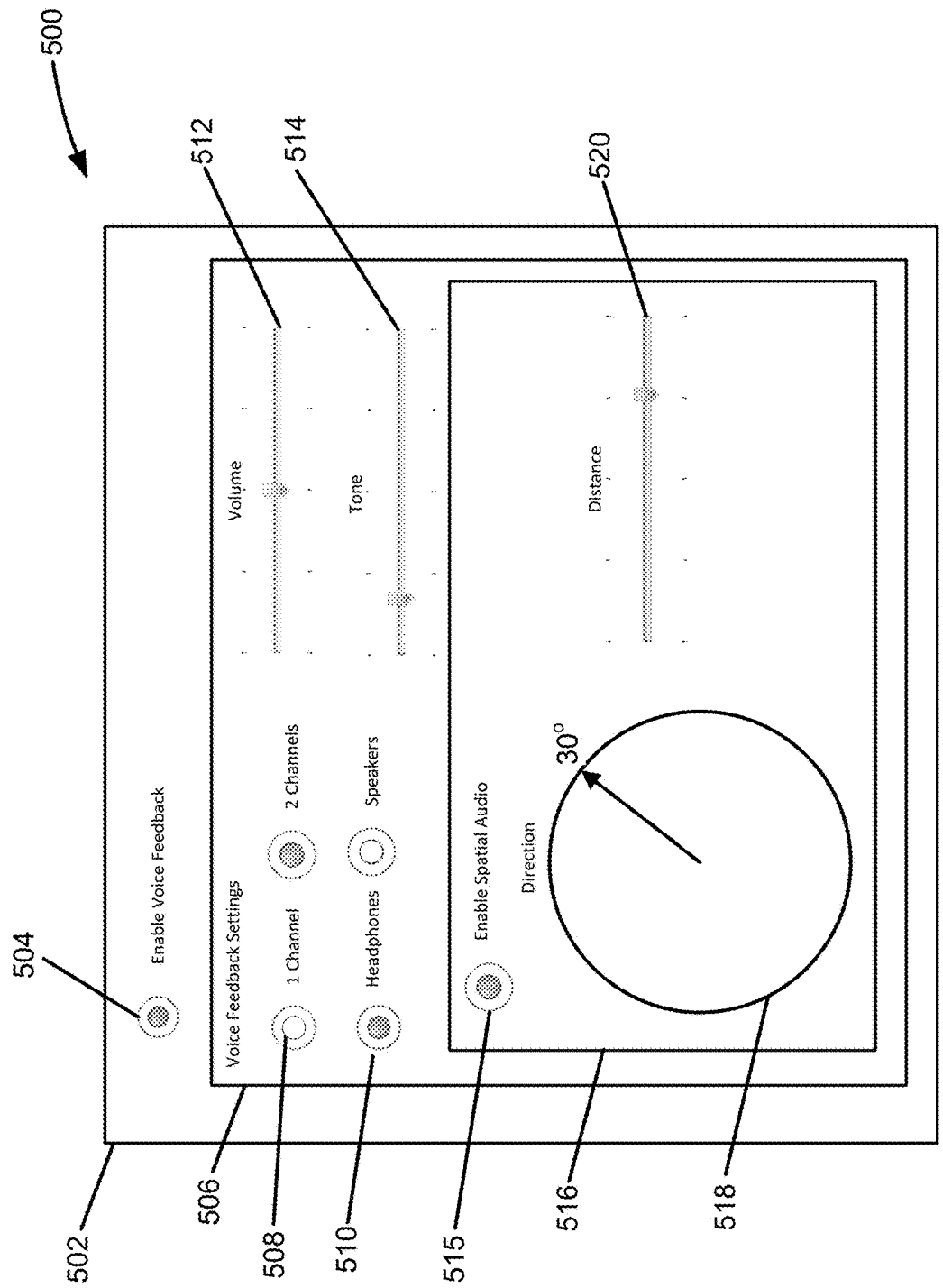
FIG. 5 shows an illustration of an example GUI that may be used with a system providing voice feedback for video conferences, according to some aspects of the present disclosure.

Referring now to FIG. 4, FIG. 4 shows an example of a system 400 for voice feedback during video conferences, according to some aspects of the present disclosure. System 400 depicts an example implementation of client device 306. The modules making up the client device 306 described herein may be implemented as hardware, software, or both. In some examples, some modules included in client device 306 may be hosted in other devices or remote servers. For example, modules included in the audio processing module 406 may be standalone hardware modules. Configurations relating to voice feedback during video conferences can be viewed and input using client device 306 by way of a graphical user interface (GUI) 430. The GUI 430 may be displayed on a personal computer screen, smartphone screen, tablet screen, or the like. An example GUI is depicted in FIG. 5.

The client device 306 can join a video conference hosted by video conference provider 426. The video conference may have one or more participants, including the user of the client device 306. Some video conferences may have a plurality of participants using a plurality of client devices 428.

Video conferencing functions on client device 306 are provided by video conferencing module 432. A video conference can include one or more video streams and one or more audio streams. The user of the client device 306 may have an associated video stream and audio stream, both of which can be selectively enabled or disabled. The video and audio streams are sent to the video conference provider 426 by way of the I/O module 418. Likewise, each of the other client devices 428 that are participating in the video conference may have a video stream and an audio stream that can be selectively enabled or disabled. The video and audio streams of the client devices 428 are sent to the video conference provider 426 and then provided to the client device 306 by way of the I/O module 418 for display and playback.

Capture of the audio stream of the client device 306 begins with one or more microphones 402, 404. The client device 306 may be communicatively coupled with an external microphone 402 or an internal microphone 404. The external microphone 402 may be a commercially available microphone that is connected to the client device using a wire or wirelessly connected using WiFi, Bluetooth, etc. Any suitable type of external microphone 402 for capture of audio information may be used, including dynamic microphones, condenser microphones, and ribbon microphones, among other types.

The internal microphone 404 may be a hardware microphone integrated into the client device 306. For example, if the client device 306 is a smartphone, it may include an internal microphone used to capture voice for phone calls, video conferences, voice memos, etc. The internal microphone 404 may be, for example, an electret microphone, a MicroElectrical-Mechanical System ("MEMS") microphone, or any other suitable design for embedded hardware in the client device 306.

The microphones 402, 404 may be monophonic ("mono") microphones that capture one audio channel. Alternatively, the microphones 402, 404 may be stereo microphones that capture two audio channels simultaneously. The microphones 402, 404 may be cardioid microphones, configured for optimal reception of audio from the front and sides, or they may be directional microphones, among other possible configurations. These examples of audio capture technology are not intended to be limiting and one skilled in the art will recognize that other configurations and technologies may be used to implement microphones 402, 404.

The captured audio stream is sent to the audio processing module 406. The audio processing module 406 comprises modules that may be implemented as hardware, software, or both. For example, the automatic echo cancellation ("AEC") module 408 may be a software component or a hardware component embedded in the client device, including circuitry to implement the functionality of that module. The audio processing module 406 contains one or more modules for processing of the captured audio stream prior to playback. The example system 400 depicts several example modules making up audio processing module 406, but other processing modules are possible in other embodiments. Example system 400 depicts one possible arrangement of the sound processing modules, but the incoming audio stream may be processed in any order or configuration according to the software or hardware implementation of the client device 306. The modules of the audio processing module 406 can be selectively enabled and disabled and may each have independent configuration settings. For example, the AEC module 408 may be disabled during high-fidelity music mode. High-fidelity music mode can disable AEC or other audio processing, as well while enabling other audio processing or capture configurations like, for instance, raising audio codec quality.

The audio processing module 406 includes an AEC module 408. The AEC module 408 filters noise from the captured audio stream that is due to the played back audio streams from other participants. For example, if a video conference includes a plurality of participants, for a participant using client device 306, the audio streams from the other participants may be played back on speakers 422 and simultaneously captured by a microphone 402. The result may be a positive feedback loop resulting in undesirable echoes or other audio artifacts. The AEC module 408 can filter the other participants' audio streams from the captured audio (echo cancellation) and reduce or eliminate the undesired audio artifacts.

The audio processing module 406 includes an auto gain control module 410. The automatic gain control ("AGC") module 410 includes program code or circuitry to equalize the volume level of different audio streams. For example, the incoming audio stream from other video conference participants may be at a high volume and the captured audio from client device 306 may be at a low volume. The AGC module 410 may apply gain/loss or otherwise (de-)amplify the magnitude of the captured audio stream so that the captured audio stream is played back to the other participants at a volume comparable to their local audio settings to provide a consistent audio experience to all users.

The audio processing module 406 includes a denoise module 412. The denoise module 412 may be used for background noise suppression. The denoise module 412, in some examples, can adjust the magnitude of background noise suppression based on detected background noise. In some examples, the level of background noise suppression can be manually controlled by the user of the client device 306. For instance, the denoise module 412 may provide options, via the GUI 430, to apply low, medium, or high levels of background noise suppression according to the needs of the user.

Following processing for audio quality, the audio processing module 406 may send the audio stream to additional modules that may be enabled using one or more configuration settings. For example, in some configurations, the audio processing module 406 sends the audio stream to a voice alteration module 414. The voice alteration module 414 may be used to change the sound of the audio stream, for example, for theatrical, entertainment, or for security reasons. In some examples, the voice alteration module 414 may include one or more trained machine learning models to perform voice conversion or accent conversion functionality.

In some configurations, the audio processing module 406 sends the audio stream to spatial audio module 416. Spatial audio module 416 can be used to prepare the audio stream for playback with an apparent source distance and an apparent source direction using at least two audio channels. In effect, the spatial audio module 416 can impart an apparent source distance and an apparent source direction to the voice feedback. For example, the spatial audio module 416 may be implemented using binaural room impulse responses ("BRIR"). BRIRs are measured or calculated impulse functions that can be convolved with audio streams to create the effect of sound heard by human ears in a particular three-dimensional geometry. With the spatial audio module 416 enabled, the audio stream may be transformed such that when it is played back on headphones or speakers, the sound source has an apparent distance and direction. The distance and direction may be configurable.

In some examples, a BRIR function may be calculated or measured for each playback audio channel. The BRIR functions may correspond to the configurations associated with the apparent source geometry. When an incoming audio stream is captured, the incoming audio stream can be convolved with the BRIR of each audio channel. The convolution of each BRIR with the incoming audio stream produces a transformed audio stream that accurately reproduces the configured apparent geometry during playback over two or more audio channels.

The processed audio stream is sent from the audio processing module 406 to I/O module 418 for transmission to the other video conference participants using client devices 428. The I/O module 418 provides networking services for the client device 306. For example, the video conference may be hosted by the video conference provider 426. The client device 306 may send one or more video streams and one or more audio streams to the video conference provider 426 and may receive one or more video streams or one or more audio streams from the other video conference participants using client devices 428.

In some examples, the I/O module 418 can maintain one or more open sockets between the client device 306 and the video conference provider 426 for sending and receiving of data. In some examples, the I/O module 418 may send and receive data using the Hypertext Transfer Protocol ("HTTP") protocol in collaboration with an application programming interface ("API") endpoint provided by the video conference provider 426. Other protocols and networking approaches may be used including, for example, the Transmission Control Protocol ("TCP") or User Datagram Protocol ("UDP") protocols. In some other examples, client devices may use point-to-point networking with no intermediary using, for example, the Point-to-Point Protocol ("PPP").

The video conference provider 426 may be similar to the video conference provider 110, 210 described in FIGS. 1 and 2. The components of the video conference provider 330 may be implemented as hardware, software, or both. The video conference provider 426 may be used for planning, hosting, coordination of, and securing video conferences among a plurality of participants, among other functions. The video conference provider 426 receives the outgoing, processed audio stream of the client device 306 and relays it to the client devices 428 of the other video conference participants for playback.

The I/O module 418 can send received audio streams to the audio out module 420 for playback on one or more playback audio devices 422, 424. The audio out module 420 can provide hardware connection points for the one or more playback audio devices 422, 424. In addition, the audio out module 420 can receive audio streams from other modules and prepare them for playback. For example, the audio out module 420 may include components for signal processing including digitization, amplification, equalization, introducing delays, or other dynamic effects.

Audio playback devices 422, 424 include one or more speakers 422 and headphones 424. Speakers 422 may play back audio over one or more audio channels. Speakers 422 may themselves include one or more speakers. In other words, one physical speaker may include a plurality of internal speakers. Speakers 422 may include a variety of speaker types and configurations. For example, speakers 422 may include various dynamic ranges, including, for example, midrange speakers, woofers, tweeters, subwoofers, and the like. Speakers 422 may be constructed according to one or more audio projection technologies including dynamic speaker construction, horn speaker construction, electrostatic speaker construction, and planar-magnetic speaker construction, among others.

Likewise, headphones 424 may include one or more speakers embedded in one or more earpieces. Like with the speakers 422, the embedded speakers may themselves include one or more speakers. For instance, an earpiece enclosure may contain one or more speakers. Headphones 424 may play back audio over one or more audio channels. Various types of headphones 424 may be used in different embodiments including closed-back headphones, open-back headphones, on-ear headphones, over-ear headphones, in-ear headphones, earbuds, Bluetooth headphones, and noise-cancelling headphones, among others. These examples of audio output hardware are intended to be non-limiting and a person having skill in the art will recognize that a large variety of audio hardware may be used for playing back audio.

Using the innovations of the present disclosure, the user of the client device 306 can enable voice feedback. In that case, the processed audio stream of the user of client device 306 is sent from the audio processing module 406 to audio out module 420 in addition to the I/O module 418. The user's own audio stream may be played back over the one or more audio playback devices, including speakers 422 and headphones 424. At the same time, the user's own audio stream is sent to the client devices 428 of the other video conference participants who can also hear the user's own audio stream at the same time the user hears it. Both the client devices 428 of the other video conference participants and the client device 306 of the user are played back the same processed audio stream, in near real-time.

Audio out module 420 can provide implementations of configurations related to voice feedback. For example, enablement and disablement of voice feedback may be provided using software components, hardware components, or a combination of both in the audio out module 420. For example, disabling voice feedback may open a circuit within the audio out module 420, or it may disable a software component, in both cases preventing voice feedback playback. Likewise, configurations relating to volume, tone, and other audio stream qualities may be implemented through hardware and software modules of the audio out module 420.

With voice feedback enabled and the user's own audio stream playing back over the audio playback devices 422, 424 of the client device 306, several improvements to the client device may be realized. In some examples, because the voice feedback is implemented within the client device 306, with no need for a round-trip to a remote server, the voice feedback may have no discernable lag or delay in playback of the user's outgoing audio stream, resulting in near real-time feedback. During a video conference with several participants, correction of talking into a muted microphone can occur much more quickly since the user will be expecting to hear but be unable to hear their own voice.

The effects of de-noising processing and other signal processing can be heard by the user without the need to receive delaying feedback from other participants to determine the effects of such processing. For instance, some examples may include a voice alteration module 414 that can be used to change the sound of the audio stream, for example, for theatrical, entertainment, or for security reasons. The effect of such a module can be immediately discerned and adjusted as needed. Similarly, the impact that background noise might have on a video conference can be immediately determined by the user, again without the need to receive feedback from other participants. For instance, a non-participant may be speaking in the vicinity of a user's microphone. With voice feedback enabled, it can be quickly realized that the other participants can inadvertently hear the voice of the non-participant.

In some cases, a user might be the only participant in a video conference created for the purpose of making a recording for others to view. It may not be possible to monitor the audio while such a self-recording is made, resulting in the frustrating need to re-create the recording. The voice feedback can allow a user making a self-recording to monitor the quality, level, processing, etc. of their own audio stream during the creation of the recording.

Turning next to FIG. 5, FIG. 5 shows an illustration of an example GUI 500 that may be used with a system providing voice feedback for video conferences. The example GUI 500 may be displayed, for example, on a screen included with client device 306. The example GUI 500 may include controls for adjusting configurations or settings. The voice feedback dialog 502 may be included, for example, on a client device 306 settings page that can be accessed through one or more system menus. The voice feedback dialog 502 includes a voice feedback enable switch 504. The voice feedback enable switch 504 can be used to toggle voice feedback playback through audio out module 420. The voice feedback enable switch 504 can be used to toggle voice feedback using software, hardware, or a combination of both. For example, operating the voice feedback enable switch 504 may open a circuit between the audio processing module 406 and the audio out module 420, or it may disable a software component, preventing voice feedback playback.

When the voice feedback enable switch 504 is in the enabled position, the voice feedback settings dialog 506 is visible and/or enabled. In contrast, when the voice feedback enable switch 504 is in the disabled position, the voice feedback settings dialog 506 may be disabled (greyed out) or not visible to the user. The voice feedback settings dialog 506 includes a channel number selector 508. The channel number selector 508 can be used to determine whether voice feedback is played back through one, two, or more channels associated with the connected audio playback devices. The audio output device selector 510 can be used, for example, to select voice feedback playback through headphones, speakers, or both. Example GUI 500 depicts one example channel number selector 508 and one example audio output device selector 510, but one skilled in the art will recognize that a variety of hardware configurations may be selected with an appropriate GUI or other means of configuration (e.g., a configuration file or system parameters).

Voice feedback settings dialog 506 includes voice feedback volume slider 512 and voice feedback tone slider 514. These example controls may be used to distinguish the sounds of voice playback from other audio streams being played back simultaneously including, for example, the audio streams of other video conference participants. For example, voice feedback volume slider 512 may be used to play voice feedback at a low volume in order to be audible to the user, but not disruptive or otherwise preventative of hearing the video conference. In some examples, there may be additional volume sliders. For instance, a volume slider may be used to control the volume of the audio stream of other participants as a group or individually. The volumes of the voice feedback audio stream and of other audio streams may be varied independently. Automatic gain control in concert with regulation of voice feedback volume can allow video conference participants to regulate the volume of their own voice based on the voice feedback. For example, with the feedback volume slider 512 at a high setting, for a participant speaking too loudly, the intensity of the experienced voice feedback will be strong and cause the participant to lower their voice.

Likewise, the voice feedback tone slider 514 can be used to vary the pitch or tone of the voice feedback to distinguish the sounds of voice playback from other audio streams being played back simultaneously including, for example, the audio streams of other video conference participants. For example, voice feedback tone slider 514 may be used to playback voice feedback at a high pitch so that it is clearly distinguishable from the audio streams of other video conference participants.

Voice feedback settings dialog 506 includes a spatial audio settings dialog 516. When the spatial audio enable switch 515 is configured in the enable setting, the spatial audio settings dialog 516 may become visible/enabled. In some embodiments, enablement of spatial audio can cause channel number selector 508 to automatically change to the 2 channels setting since spatial audio requires at least 2 audio channels. In this case, the 1 channel setting may be disabled (greyed out). When the spatial audio enable switch 515 is configured in the disable setting, the spatial audio settings dialog 516 may become non-visible or disabled (greyed out).

Spatial audio may be controlled, among other possible configuration settings, by providing GUI controls for apparent source distance or direction. Spatial audio direction control 518 provides an adjustable arrow, or comparable GUI element, for adjustment of the direction of the apparent audio source with voice feedback and spatial audio enabled. For example, in example GUI 500, the spatial audio direction control 518 is configured to indicate an apparent source direction of 30° relative to the client device 306. A setting of 0° will result in an apparent source direction of directly in front of the client device 306 while a setting of 180° will result in an apparent source direction directly behind the client device 306. In some embodiments, calibration of the spatial audio direction control 518 may be needed to correctly map relative directions to the physical orientation of the client device 306. In some examples, three-dimensional spatial audio can be provided. Three-dimensional spatial audio can allow for the source to vary in both apparent direction and apparent altitude. Additional GUI controls may be included for configuration of three-dimensional spatial audio (not shown). Spatial audio distance control 520 provides an adjustable slider, or comparable GUI element, for adjustment of the distance of the apparent audio source with voice feedback and spatial audio enabled.

Figure 6:
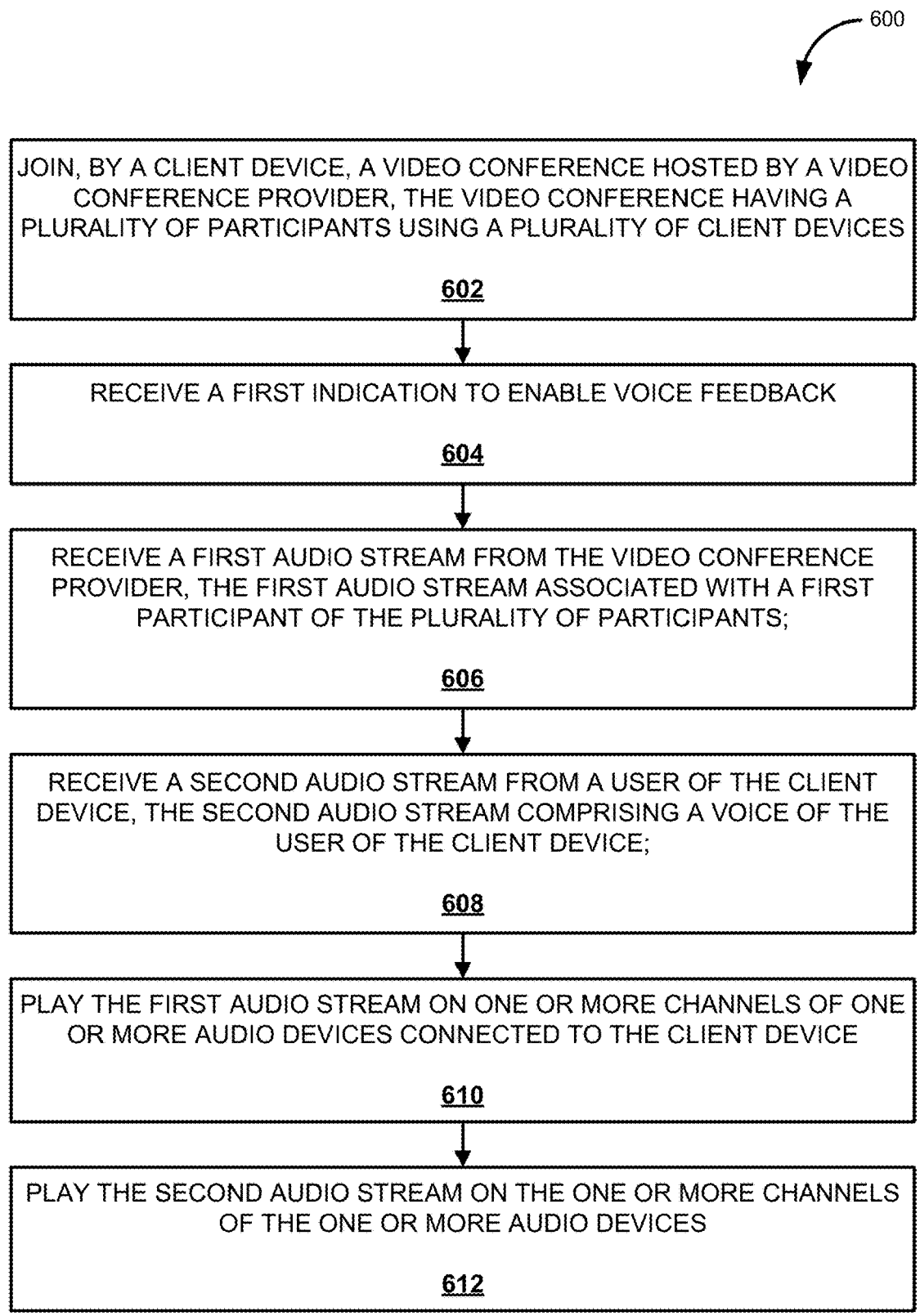
FIG. 6 shows a flowchart of an example method for providing voice feedback for video conferences, according to some aspects of the present disclosure.

Referring now to FIG. 6, FIG. 6 shows a flowchart of an example method 600 for providing voice feedback for video conferences. The description of the method 600 in FIG. 6 will be made with reference to FIGS. 3-5, however any suitable system according to this disclosure may be used, such as the example systems 100 and 200, shown in FIGS. 1 and 2.

It should be appreciated that method 600 provides a particular method for providing voice feedback for video conferences. Other sequences of operations may also be performed according to alternative examples. For example, alternative examples of the present disclosure may perform the steps outlined above in a different order. Moreover, the individual operations illustrated by method 600 may include multiple sub-operations that may be performed in various sequences as appropriate to the individual operation. Furthermore, additional operations may be added or removed depending on the particular applications. Further, the operations described in method 600 may be performed by different devices. One of ordinary skill in the art would recognize many variations, modifications, and alternatives.

The method 600 may include block 602. At block 602, a client device 306 may join a video conference hosted by a video conference provider 426, generally as described above with respect to FIGS. 1-2. The video conference may have a plurality of participants using a plurality of client devices. As described with respect to FIGS. 1 and 2, the video conference includes a multiplexed collection of audio and video streams corresponding to each respective participant in the video conference. The client device 306 captures outgoing video and audio streams and sends them to the client devices 428 of the other participants via the video conference provider 426 or using point-to-point networking. Conversely, the client device 306 receives audio and video streams from each of the client devices 428 of the other video conference participants via the video conference provider 426 or using point-to-point networking.

An audio stream may comprise any collection of audio data being sent from a source to one or more audio output devices. An audio stream from the client devices 428 of other video conference participants may be sent, for example, to multiple audio playback devices simultaneously. For instance, the audio stream from the client devices 428 may be sent to both speakers 422 and headphones 424 of the client device 306 for playback. Similarly, the audio stream from the client devices 428 may be sent to both a first channel and second channel of an audio playback device simultaneously. The endpoint of an audio stream can be changed using a configuration operation provided, for example, by a suitable GUI. Audio streams from disparate sources can be combined. For example, two client devices may be used to capture audio streams which can be processed into audio streams using analog-to-digital conversion software or hardware. The audio streams may be combined by the video conference provider 426 and then combined into a single audio stream, in analogy to audio from two sources being played over a single audio playback channel.

The method 600 may include block 604. At block 604, the client device may receive a first indication to enable voice feedback. For example, voice feedback can be enabled using a suitable GUI including the example GUI 500. In example GUI 500, toggling of the voice feedback enable switch 504 can provide an indication to the client device to enable voice feedback. Voice feedback may then be enabled by changing a software or hardware element in audio out module 420 or other suitable location to enable voice feedback over playback devices 422, 424. In some examples, voice feedback may be automatically enabled. For example, if the client device 306 detects that the user is using headphones as an audio output device, it may automatically enable voice feedback. This may be done because otherwise, the user's own voice may be muffled by the headphones without the additional voice feedback.

The method 600 may include block 606. At block 606, the client device may receive a first audio stream associated with a first participant of the plurality of participants from the video conference provider 426. For example, in a video conference including the client device 306 and client devices 428 for a plurality of other participants, the first audio stream may be the incoming audio stream for one of the other participants. The first audio stream can be received by the I/O module 418 and sent to the audio out module 420 for playback on one or more connected audio playback devices, for example, speakers 422 or headphones 424.

The method 600 may include block 608. At block 608, the client device may receive a second audio stream from a user of the client device 306, the second audio stream comprising a voice of the user of the client device 306. For example, the second audio stream can be first captured using one or more microphones 402, 404. In some examples, the audio stream can be digitized using analog-to-digital conversion software or hardware. Following capture, the second audio stream can be processed by the modules in the audio processing module 406 and then sent to the audio out module 420 for playback on one or more connected audio playback devices, for example, speakers 422 or headphones 424.

The method 600 may include block 610. At block 610, the client device 306 may play the first audio stream on one or more channels of one or more audio devices connected to the client device 306. The user of client device 306 may select an audio output device for playback of the first audio stream using suitable controls including, for example, the audio output device selector 510. Audio output device selector 510 can be used to select voice feedback playback through headphones, speakers, or any of a variety of hardware configurations. For example, the audio out module 420 may play back the first audio stream on the speakers 422 or the headphones 424. In both cases, one audio channel may be suitable for playback of the audio stream of the first participant, but two or more audio channels can also be used.

The method 600 may include block 612. At block 612, the client device 306 may play the second audio stream on the one or more channels of the one or more audio devices. The user of client device 306 may again select an audio output device for playback of the second audio stream using suitable controls including, for example, the audio output device selector 510. Audio output device selector 510 can be used to select voice feedback playback through headphones, speakers, or any of a variety of hardware configurations. With voice feedback enabled, both the first audio stream of the first participant and the second audio stream of the user of the client device 306 are played back simultaneously, thereby providing the improvements over audio technology of the present disclosure. In some examples, the first audio stream can be played back on a first channel of an audio playback device while the second audio stream is played back on a second channel of the audio playback device. In some other examples, the first audio stream can be played back on one audio playback device, for example, the speakers 422, while the second audio stream is played back on the headphones 424. One skilled in the art will recognize that a variety of hardware playback configurations are possible when voice feedback is played back simultaneously with the video conference audio stream.

In addition to playback on different channels or playback devices, the second audio stream can be further distinguished from the first audio stream using spatial audio techniques as discussed in detail above with respect to FIGS. 4 and 5. For example, the second audio stream can be sent through a spatial audio module 416 as it transits the audio processing module 406. The spatial audio module 416 can apply a spatial audio algorithm to the second audio stream to cause the user of the client device 306 to hear an apparent sound source and direction during playback over two or more channels. In another example, the volume, tone, and other sound qualities of the second audio stream can be varied to distinguish the second audio stream from the first audio stream.

Figure 7:
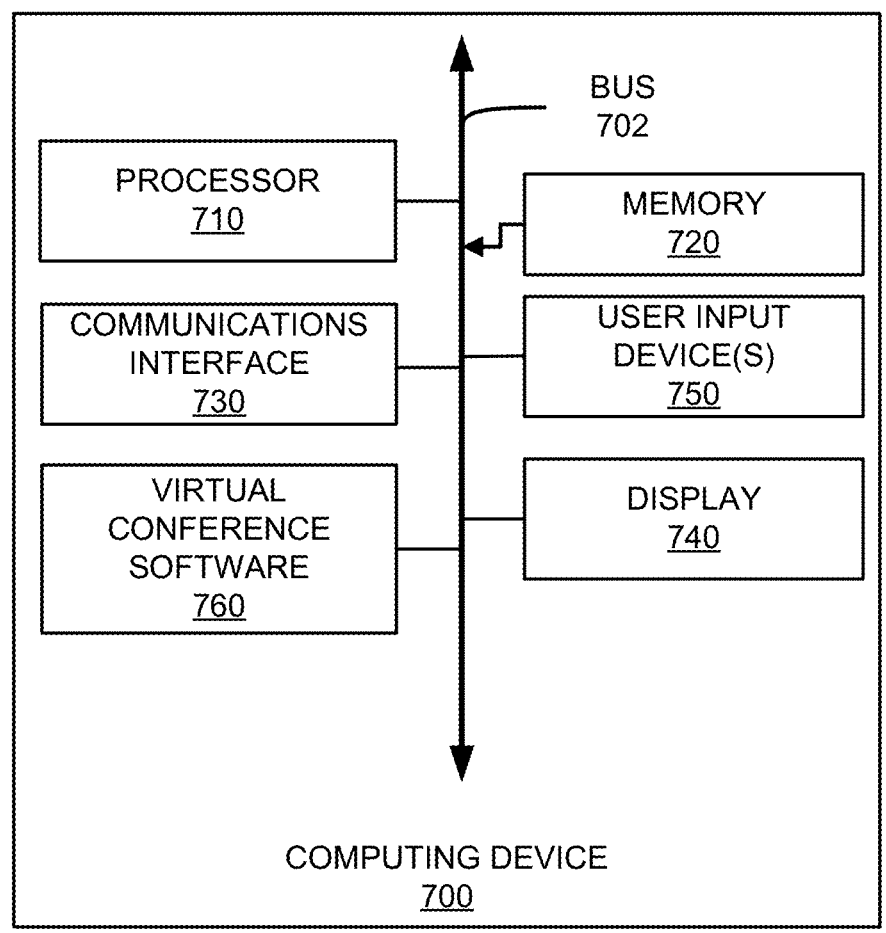
FIG. 7 shows an example computing device suitable for use in example systems or methods for providing video feedback for video conferences, according to some aspects of the present disclosure.

Referring now to FIG. 7, FIG. 7 shows an example computing device 700 suitable for use in example systems or methods for providing voice feedback for video conferences according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for voice feedback during video conferences according to different examples, such as part or all of the example method 600 described above with respect to FIG. 6. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes virtual conferencing software 760 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a computer-implemented method, comprising: joining, by a client device, a video conference hosted by a video conference provider, the video conference having a plurality of participants using a plurality of client devices; receiving a first indication to enable voice feedback; receiving a first audio stream from the video conference provider, the first audio stream associated with a first participant of the plurality of participants; receiving a second audio stream from a user of the client device, the second audio stream comprising a voice of the user of the client device; playing the first audio stream on one or more channels of one or more audio devices connected to the client device; and playing the second audio stream on the one or more channels of the one or more audio devices.

Example 2 is the method of example(s) 1, wherein: the first audio stream is played on a first channel of the one or more audio devices; and the second audio stream is played on the first channel of the one or more audio devices.

Example 3 is the method of example(s) 1, wherein: the first audio stream is played on a first channel of the one or more audio devices; and the second audio stream is played on a second channel of the one or more audio devices.

Example 4 is the method of example(s) 3, further comprising: processing the second audio stream using a spatial audio algorithm, wherein the processing adds an apparent source distance and apparent source direction to the second audio stream; and playing the processed second audio stream on the first channel and the second channel of the one or more audio devices, to cause the user of the client device to hear the apparent source distance and the apparent source direction.

Example 5 is the method of example(s) 1, further comprising: processing the second audio stream using at least one of: a gain control algorithm, an automatic echo cancellation algorithm, and a de-noising algorithm.

Example 6 is the method of example(s) 1, further comprising: processing the second audio stream using a voice alteration algorithm.

Example 7 is the method of example(s) 1, wherein the one or more audio devices comprise audio headphone including at least two earpieces, each earpiece comprising at least one channel.

Example 8 is the method of example(s) 1, wherein the one or more audio devices comprise a first speaker and a second speaker, each speaker comprising at least one channel.

Example 9 is the method of example(s) 1, wherein the first audio stream has a first volume level and the second audio stream has a second volume level, wherein the first volume level can be varied independently of the second volume level.

Example 10 is the method of example(s) 1, further comprising: receiving a second indication to disable voice feedback; and stopping the playing of the second audio stream.

Example 11 is a system comprising: one or more processors configured to: join, by a client device, a video conference hosted by a video conference provider, the video conference having a plurality of participants using a plurality of client devices; receive a first indication to enable voice feedback; and receive a first audio stream from the video conference provider, the first audio stream associated with a first participant of the plurality of participants receive a second audio stream from a user of the client device, the second audio stream comprising a voice of the user of the client device play the first audio stream on one or more channels of one or more audio devices connected to the client device; and play the second audio stream on the one or more channels of the one or more audio devices.

Example 12 is the system of example(s) 11, wherein: the first audio stream is played on a first channel of the one or more audio devices; and the second audio stream is played on the first channel of the one or more audio devices.

Example 13 is the system of example(s) 11, wherein: the first audio stream is played on a first channel of the one or more audio devices; and the second audio stream is played on a second channel of the one or more audio devices.

Example 14 is the system of example(s) 13, further comprising: processing the second audio stream using a spatial audio algorithm, wherein the processing adds an apparent source distance and apparent source direction to the second audio stream; and playing the processed second audio stream on the first channel and the second channel of the one or more audio devices, to cause the user of the client device to hear the apparent source distance and the apparent source direction.

Example 15 is the system of example(s) 11, wherein the first audio stream has a first volume level and the second audio stream has a second volume level, wherein the first volume level can be varied independently of the second volume level.

Example 16 is a non-transitory computer-readable medium storing a set of instructions, the set of instructions comprising: one or more instructions that, when executed by one or more processors of a device, cause the device to: join, by a client device, a video conference hosted by a video conference provider, the video conference having a plurality of participants using a plurality of client devices; receive a first indication to enable voice feedback; and receive a first audio stream from the video conference provider, the first audio stream associated with a first participant of the plurality of participants receive a second audio stream from a user of the client device, the second audio stream comprising a voice of the user of the client device play the first audio stream on one or more channels of one or more audio devices connected to the client device; and play the second audio stream on the one or more channels of the one or more audio devices.

Example 17 is the non-transitory computer-readable medium of example(s) 16, wherein: the first audio stream is played on a first channel of the one or more audio devices; and the second audio stream is played on the first channel of the one or more audio devices.

Example 18 is the non-transitory computer-readable medium of example(s) 16, wherein: the first audio stream is played on a first channel of the one or more audio devices; and the second audio stream is played on a second channel of the one or more audio devices.

Example 19 is the non-transitory computer-readable medium of example(s) 18, further comprising: processing the second audio stream using a spatial audio algorithm, wherein the processing adds an apparent source distance and apparent source direction to the second audio stream; and playing the processed second audio stream on the first channel and the second channel of the one or more audio devices, to cause the user of the client device to hear the apparent source distance and the apparent source direction.

Example 20 is the non-transitory computer-readable medium of example(s) 16, wherein the first audio stream has a first volume level and the second audio stream has a second volume level, wherein the first volume level can be varied independently of the second volume level.

That which is claimed is:

1. A computer-implemented method, comprising:
    joining, by a client device used by a first participant, a video conference hosted by a video conference provider, the video conference having a plurality of participants, including the first participant, using a plurality of client devices;
    receiving, from the client device, a first indication to enable voice feedback caused by a first input by the first participant;
    receiving a first audio stream from the video conference provider, the first audio stream associated with the first participant of the plurality of participants;
    receiving a second audio stream from a user of the client device, the second audio stream comprising a voice of the user of the client device;
    playing the first audio stream on one or more channels of one or more audio devices connected to the client device;
    playing the second audio stream on the one or more channels of the one or more audio devices; and
    responsive to receiving, from the client device a second indication to disable voice feedback, stopping the playing of the second audio stream.

2. The method of claim 1, wherein:
    the first audio stream is played on a first channel of the one or more audio devices; and
    the second audio stream is played on the first channel of the one or more audio devices.

3. The method of claim 1, wherein:
    the first audio stream is played on a first channel of the one or more audio devices; and
    the second audio stream is played on a second channel of the one or more audio devices.

4. The method of claim 3, further comprising:
    processing the second audio stream using a spatial audio algorithm, wherein the processing adds an apparent source distance and apparent source direction to the second audio stream; and
    playing the processed second audio stream on the first channel and the second channel of the one or more audio devices, to cause the user of the client device to hear the apparent source distance and the apparent source direction.

5. The method of claim 4, wherein the spatial audio algorithm is based on binaural room impulse responses.

6. The method of claim 1, further comprising:
    processing the second audio stream using at least one of: a gain control algorithm, an automatic echo cancellation algorithm, and a de-noising algorithm.

7. The method of claim 1, further comprising:
    processing the second audio stream using a voice alteration algorithm.

8. The method of claim 1, wherein the one or more audio devices comprise audio headphone including at least two earpieces, each earpiece comprising at least one channel.

9. The method of claim 1, wherein the one or more audio devices comprise a first speaker and a second speaker, each speaker comprising at least one channel.

10. The method of claim 1, wherein the first audio stream has a first volume level and the second audio stream has a second volume level, wherein the first volume level can be varied independently of the second volume level.

11. A system comprising:
    one or more processors configured to:
        join, by a client device used by a first participant, a video conference hosted by a video conference provider, the video conference having a plurality of participants, including the first participant, using a plurality of client devices;
        receive, from the client device, a first indication to enable voice feedback caused by a first input by the first participant;
        receive a first audio stream from the video conference provider, the first audio stream associated with the first participant of the plurality of participants;
        receive a second audio stream from a user of the client device, the second audio stream comprising a voice of the user of the client device
        play the first audio stream on one or more channels of one or more audio devices connected to the client device;
        play the second audio stream on the one or more channels of the one or more audio devices; and
        responsive to receiving, from the client device a second indication to disable voice feedback, stop the playing of the second audio stream.

12. The system of claim 11, wherein:
    the first audio stream is played on a first channel of the one or more audio devices; and
    the second audio stream is played on the first channel of the one or more audio devices.

13. The system of claim 11, wherein:
    the first audio stream is played on a first channel of the one or more audio devices; and
    the second audio stream is played on a second channel of the one or more audio devices.

14. The system of claim 13, further comprising:
    processing the second audio stream using a spatial audio algorithm, wherein the processing adds an apparent source distance and apparent source direction to the second audio stream; and playing the processed second audio stream on the first channel and the second channel of the one or more audio devices, to cause the user of the client device to hear the apparent source distance and the apparent source direction.

15. The system of claim 11, wherein the first audio stream has a first volume level and the second audio stream has a second volume level, wherein the first volume level can be varied independently of the second volume level.

16. A non-transitory computer-readable medium storing a set of instructions, the set of instructions comprising:
one or more instructions that, when executed by one or more processors of a device, cause the device to:
join, by a client device used by a first participant, a video conference hosted by a video conference provider, the video conference having a plurality of participants, including the first participant, using a plurality of client devices;
receive, from the client device, a first indication to enable voice feedback caused by a first input by the first participant;
receive a first audio stream from the video conference provider, the first audio stream associated with the first participant of the plurality of participants;
receive a second audio stream from a user of the client device, the second audio stream comprising a voice of the user of the client device
play the first audio stream on one or more channels of one or more audio devices connected to the client device;
play the second audio stream on the one or more channels of the one or more audio devices; and
responsive to receiving, from the client device a second indication to disable voice feedback, stop the playing of the second audio stream.

17. The non-transitory computer-readable medium of claim 16, wherein:
the first audio stream is played on a first channel of the one or more audio devices; and
the second audio stream is played on the first channel of the one or more audio devices.

18. The non-transitory computer-readable medium of claim 16, wherein:
the first audio stream is played on a first channel of the one or more audio devices; and
the second audio stream is played on a second channel of the one or more audio devices.

19. The non-transitory computer-readable medium of claim 18, further comprising:
processing the second audio stream using a spatial audio algorithm, wherein the processing adds an apparent source distance and apparent source direction to the second audio stream; and
playing the processed second audio stream on the first channel and the second channel of the one or more audio devices, to cause the user of the client device to hear the apparent source distance and the apparent source direction.

20. The non-transitory computer-readable medium of claim 16, wherein the first audio stream has a first volume level and the second audio stream has a second volume level, wherein the first volume level can be varied independently of the second volume level.

* * * * *